United States Patent Office 2,708,198
Patented May 10, 1955

2,708,198

PENTAERYTHRITE-DICHLORHYDRINE MONOSULFUROUS ACID ESTERS

Helmut Pietsch, Dusseldorf, Germany, assignor to Henkel & Cie., G. m. b. H., Dusseldorf-Holthausen, Germany, a German corporation No Drawing. Application April 30, 1952,
Serial No. 285,311

Claims priority, application Germany May 26, 1951

19 Claims. (Cl. 260—327)

This invention relates to new and useful improvements in pentaerythrite-dichlorohydrine monosulfurous acid esters.

When reacting thionyl chloride with pentaerythrite (tetramethylol methane) in the presence of pyridine, a hitherto unknown chemical compound, the monosulfurous acid ester of the pentaerythrite-dichlorhydrine, is obtained. This ester, for the sake of brevity hereinafter referred to as the p-d sulfurous acid ester probably possesses the following constitutional formula:

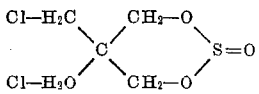

Depending upon reaction conditions and amounts of materials used different hydrochloric acid esters of pentaerythrite or mixtures of such esters are obtained in addition to the p-d sulfurous acid ester. When using pentaerythrite, thionylchloride and pyridine in the ratios of 1:2:2, 1:3:3 or 1:4:4, the principal products are normally the pentaerythrite-dichlorohydrine, the pentaerythrite-trichlorhydrine and the pentaerythrite-tetra-hydrochloric acid ester. The raw reaction product contains lesser amounts of the p-d sulfurous acid ester, that can be isolated from the reaction mass according to process of this invention. The working up of such raw reaction mixtures, containing lesser amounts of the p-d sulfurous acid ester is shown in the Examples I and II.

The partial esterification products of the pentaerythrite with hydrochloric acid are more or less readily soluble in water depending upon the number of hydroxyl groups remaining in the molecule. On the other hand the p-d sulfurous acid ester is substantially insoluble in water. Its boiling point lies between that of the pentaerythrite-dichlorhydrine and the pentaerythrite-trichlorhydrine. Based upon the solubility and boiling point characteristics differentiating the p-d sulfurous acid esters from the pentaerythrite-di and trichlorhydrines, it is possible to isolate the p-d sulfurous acid ester from the other components of the reaction mix by a distillation, extraction, crystallization, or a combination thereof.

In the preparation of the p-d sulfurous acid ester it is of advatnage to use at least 2 mol thionyl chloride for each mol pentaerythrite. Preferably, however, at least 3 mol thionyl chloride per each mol pentaerythrite are used and it is in many cases of advantage to use an amount of thionyl chloride in excess of this ratio.

Within the preferred embodiment of my invention particularly large yields of the p-d sulfurous acid ester are obtained as the principal product of the reaction mix by adjusting the amount of pyridine present in the reaction of thionyl chloride with the pentaerythrite so that there is present at least 0.2 mol of and less than 2 mol of pyridine for each mol of pentaerythrite.

In the preparation of the p-d sulfurous acid ester in accordance with the invention at least one of the pentaerythrite and the thionyl chloride should be mixed with the pyridine. Otherwise the sequence of addition of pentaerythrite and thionyl chloride is not critical. Especially good reaction results are obtained when mixing the pentaerythrite with a substantially inert solid diluent such as sand, silica or the like because it tends to inhibit the baking together of the pentaerythrite at the beginning of the reaction.

The reaction commences immediately upon the bringing together of the reaction components as evidenced by the increase in the temperature. The reaction is facilitated by heating. It was found however, the yield of p-d sulfurous acid ester is diminished when over-heating the reaction mix. Thus, for instance, when heating the reaction mix over an open flame lesser amounts of p-d sulfurous acid esters were obtained with otherwise identical reaction conditions than were procured when heating on an oil bath. It is therefore recommended within the scope of the preferred procedure in accordance with the invention to substantially maintain the reaction at temperatures of about 30 to 130° C. and preferably of 70 to 100° C. In most cases it suffices to work at water bath temperatures.

Before the reaction mix has worked up it is of advantage to first remove the major portion of the pyridine as well as the remnants of hydrochloric acid and sulfur dioxide as for example with the aid of a gas current passed through the reaction mix. It is also possible to remove the pyridine which is principally present in the form of its Cl-hydrate by the addition of an equivalent amount of non-volatile acid binding materials and preferably caustics followed by distillation.

Within the preferred procedure in accordance with the invention it is possible to not only remove the pyridine, hydrochloric acid and sulfur dioxide but also the water soluble pentaerythrite hydrochloric acid esters at least to an appreciable extent from the reaction product.

This is accomplished by adding more than the equal amount of water. Depending upon the amounts of the various reaction products and the amount of pyridine present there may not at first occur a layering when adding the water. This is because the organic water soluble reaction products tend to act as linking agents. A layering is however in most cases obtained by the addition of further amounts of water. Upon separation of the aqueous layer and if necessary repeated washing out with water the usually oily raw ester is obtained. The procedure can be rendered more effective if desired by the use of methods or devices conventionally applied in extraction techniques. Thus for instance the reaction product may be dissolved in an excess of a water insoluble organic solvent such as benzol or other whereupon the water soluble constituents are extracted therefrom with water. Another variation of the method comprises dissolving the reaction products in water soluble organic solvents and to thereafter precipitate the p-d sulfurous acid ester by the addition of water. The latter procedure is especially of advantage in those cases in which the reaction product contains substances of relatively low water solubility such as pentaerythrite-trichlorhydrine.

The separation of the p-d sulfurous acid ester from the other components of the reaction mix is also possible by way of distillation. The following uncorrected boiling points were found and are merely given here by way of comparisons. In each case the boiling points of some of the components as they are reported in the literature are furnished within parentheses.

Pentaerythrite-trichlorhydrine: B. P.$_4$=103–104° C. (B. P.$_{.12}$=136° C.)

Pentaerythrite-dichlorhydrine monosulfurous acid ester: B. P.$_{4-5}$=113–115° C.

Pentaerythrite-dichlorhydrine: B. P.$_{.3-4}$=145–147° C. (B. P.$_{.12}$=160° C.)

As is apparent from the various boiling points above set forth the boiling point differential is sufficiently large to permit substantial separation of the p-d sulfurous acid ester from the materials accompanying the same in the reaction mix. Depending upon the amounts of the various substances present in the starting material it is possible that the complete separation of the p-d sulfurous acid ester may become difficult if not impossible by reason of the formation of azeotropic boiling mixtures. It is of advantage to recover the cut distilling over between the boiling points of the two pentaerythrite chlorhydrines by way of fractions. It is also possible to collect the dichlorhydrine together with the cut passing over after the distillation of the trichlorhydrine and to thereafter separate the collected mixture in accordance with a method other than distillation such as for example by treatment with water.

The p-d sulfurous acid ester furthermore is sufficiently volatile that it is possible to effect its recovery from the reaction product by steam distillation.

It is furthermore possible to obtain the p-d sulfurous acid ester by crystallization. In this case it may be, however, of advantage to facilitate the separation of the ester from its solution by cooling and crystal seeding.

As is common to many substances the melting points of which are only slightly higher than room temperature, the melting point of the p-d sulfurous acid ester can be appreciably depressed by small amounts of impurities so that it may be present in oily form. For many purposes this oily form of the ester may be sufficiently pure. If it is however desired to obtain the ester in crystallized form a repetition of any particular separation, removal or purification procedure or a combination of some of these procedures may give the desired results. In most cases repeated distillation will produce a crystalline product of relatively high purity.

The pentaerythrite-dichlorhydrine sulfurous acid ester in accordance with the invention constitutes a valuable technical product particularly because of the differential reactivity of the various ester groupings being thus usable for organic synthesis such as for instance in connection with pharmaceutical products, artificial resins and many other similar products and procedures.

The following examples are furnished by way of illustration but not of limitation:

Example I

There is added to a mixture of 408 grams (3 mol) pentaerythrite and 474 grams pyridine (6 mol) at first slowly and then more rapidly 714 grams of thionyl chloride (6 mol). The mix is heated with an open flame under reflux for 2 to 3 hours to a temperature of about 150 to 160° C. until no further evolution of gas can be observed. The reaction product is then washed with an equal volume of water whereupon the aqueous layer is separated from the oily layer being thereafter shaken with benzol and extracted for three days with ether. The extracts are then combined with the oily layer. Upon distillation of the oil there is obtained after the removal of the solvent and a pre-run of a B. P.$_7$ of 124–140° C. (30 grams) a principal cut which will only partially solidify and having a B. P.$_5$ of 140–155° C. (110 grams). The same is only partly soluble in hot water. When treated with hot water there remain undissolved 66 grams of a non-solidifying oil which is principally composed of the p-d sulfurous acid ester.

Example II 100 grams of the cut described in Example I as the principal cut of a B. P.$_5$ of 140–155° C. are dissolved in 110 to 120 ccm. of boiling benzol. This cut or fraction essentially represents a mixture of pentaerythrite-dichlorhydrine and its monosulfurous acid ester. Upon cooling of the benzol solution dichlorhydrine will crystallize out. After its separation the same may be re-crystallized from a benzol solution.

The combined mother liquors are then evaporated for their concentration, are freed from benzol and thereupon washed with warm water. The water insoluble portion weighs about 30 to 35 grams and comprises principally the monosulfurous acid ester of the pentaerythrite-dichlorhydrine which is thereafter purified by vacuum and/or steam distillation or by crystallization from alcohol in an ice-salt or other "cold" mixture. Crystallization may be facilitated by seeding.

Example III 408 grams of pentaerythrite (3 mol) are mixed with 80 grams of pyridine (1 mol) whereupon there is added to this mix while cooling the same at first slowly and then more rapidly 1180 grams of thionyl chloride (10 mol). The temperature of the mixture rises to about 40 to 60° C. Upon standing over night the same is heated at first for several hours at a temperature of about 40 to 60° C. and thereafter for several hours on a water bath with occasional stirring. The oily reaction product obtained after the removal of solid components is of a yellow-brown coloration and is washed three times with an equal amount of cold water by shaking the same with the water and is then distilled in a vacuo. The monosulfurous acid ester of the pentaerythrite-dichlorhydrine passes over as a heavy slightly yelowish oil of a B. P.$_4$ of 130–135° C. The end of the distillation is observable by the sudden turbidity occurring in the distillate whereupon the boiling temperature very rapidly increases. The ester can be rendered practically odorless and colorless by heating with decolorizing carbon on a steam bath, filtering and once more distilling in an efficient distillation column. The same then passes over at a B. P.$_{4-5}$ of 113–115° C. When placing the same into a cold mixture or seeding, crystallization of the ester in the form of long needles is obtained the same having a melting point of 30° C. The ester can be recrystallized from alcohol by placing a solution saturated at room temperature into a cold mixture preferably with the aid of seeding the solution.

The yield of sulfurous acid ester after the second distillation is about 400 grams corresponding to 70 to 73% of theoretic. By working up the pre-runs and after-runs of both distillations the yield may be improved.

If the reaction mix is heated to the boiling point, that is, to temperatures of about 165° C. then the yield of sulfurous acid ester is only 75 to 100 grams corresponding to 15 to 20% of theoretic even though all other reaction conditions and recovery procedures are identical with those above set forth.

Example IV 1225 grams of pentaerythrite (9 mol) are added in the course of about 2 hours to a mixture of 3540 grams thionyl chloride (30 mol) and 240 grams pyridine (3 mol) while stirring and cooling. The mixture is then permitted to stand a while with vigorous stirring being thereafter brought to steam bath temperature, the stirring being continued until no further evolution of gas can be observed. The reaction mix is then worked up as described in the preceding example and furnishes in good yield the monosulfurous acid ester of pentaerythrite-dichlorhydrine.

Example V 1224 grams of pentaerythrite (9 mol) are thoroughly mixed with an equal amount of sand and thereafter with 80 grams of pyridine (about 1 mol). There is thereafter carefully added with thorough mixing and water cooling 3540 grams of thionyl chloride (about 30 mol) adding the first ⅔ in relatively small portions whereas the last ⅓ is added relatively rapidly. The temperature rises to about 70° C. Then proceeding in this manner the baking together of the pentaerythrite is avoided by the presence of the sand. Upon the addition of the thionyl chloride the mixture is heated on the water bath for several hours to temperatures of about 90° C. until no further gas evolution can be observed. After three times vigorous washing out with equal amounts of cold water the solid constituents are removed by suction whereupon the further working up procedure follows that set forth in the preceding examples.

I claim:
1. Method for the production of pentaerythrite-dichlorohydrine monosulfurous acid ester which comprises reacting thionyl chloride and pentaerythrite in the presence of 0.2–2 mols pyridine for each mol of pentaerythrite and recovering from the reaction mix pentaerythrite-dichlorhydrine monosulfurous acid ester.
2. Method according to claim 1 in which there are used at least 2 mol of thionyl chloride for each mol of pentaerythrite.
3. Method according to claim 2 in which about 2 to 4 mol of thionyl chloride are used for each mol of pentaerythrite.
4. Method according to claim 1 in which at least 0.2 and less than 2 mol of pyridine are used for each mol of pentaerythrite.
5. Method according to claim 4 in which there are used at least 2 mol of thionyl chloride for each mol of pentaerythrite.
6. Method according to claim 5 in which about 2 to 4 mol of thionyl chloride are used for each mol of pentaerythrite.
7. Method according to claim 1 in which there are used at least 0.2 mol and less than 2 mol of pyridine for each mol of pentaerythrite, in which there are used about 2 to 4 mol of thionyl chloride for each mol of pentaerythrite, and in which said reaction is carried out at a temperature of about 30–130° C.
8. Method according to claim 7 in which said temperature is about 70–100° C.
9. Method according to claim 8 in which about 2 to 4 mol of thionyl chloride are used for each mol of pentaerythrite.
10. Method according to claim 9 in which said pentaerythrite is mixed with a solid diluent substantially inert relative to said reactant.
11. Method according to claim 1 in which there is present at least 0.2 mol and less than 2 mol of pyridine for each mol of pentaerythrite, in which there are present about 2 to 4 mol of thionyl chloride for each mol of pentaerythrite, in which said reaction mix is treated with more than an equal amount of water to thereby form an aqueous and an oily layer, in which said oily layer is separated from said aqueous layer, and in which said pentaerythrite-dichlorhydrine monosulfurous acid ester is recovered from said separated oil layer.
12. Method according to claim 11 in which said reaction is carried out at a temperature of about 30–130° C.
13. Method according to claim 12 in which said reaction mix is first dissolved in a substantially water insoluble organic solvent therefor, the solution being thereafter treated with said amount of water.
14. Method according to claim 1 in which there is present at least 0.2 mol and less than 2 mol of pyridine for each mol of pentaerythrite, in which there is present at least 2 mol of thionyl chloride for each mol of pentaerythrite, in which the reaction is carried out at a temperature of about 30–130° C., and in which said reaction mix is dissolved in a substantially water soluble organic solvent therefor, the solution being thereafter treated with water thereby precipitate the pentaerythrite-dichlorhydrine monosulfurous acid ester.
15. Method according to claim 1 in which there is present at least 0.2 and less than 2 mol of pyridine for each mol of pentaerythrite, in which there is present at least 2 mol thionyl chloride for each mol of pentaerythrite, in which said reaction is carried out at a temperature of about 30–130° C., in which said reaction mix is subjected to distillation to recover at least one fraction containing said monosulfurous acid ester, and in which said monosulfurous acid ester is obtained from said fraction.
16. Method according to claim 15 in which said reaction product is first freed from hydrochloric acid, sulfur dioxide and pyridine before being subjected to said distillation.
17. Method according to claim 16 in which said reaction product is freed from said hydrochloric acid, sulfur dioxide and pyridine by washing with more than an equal volume of water.
18. Method in accordance with claim 17 in which said fraction is washed with water for the removal of water soluble constituents therefrom.
19. Method according to claim 18 in which said fraction is re-distilled to substantially recover a re-distilled fraction of a boiling point of 113–115° C. at 4–5 mm. mercury.

References Cited in the file of this patent

FOREIGN PATENTS 710,350    Germany _____ Sept. 11, 1941

OTHER REFERENCES

Govaert et al.: Chem. Abstracts, vol. 34, pp. 3680–1 citing Natuurw. Tijdschr. vol. 21, 215–17 (French Summary), 1940.

Orthner: Berichte, Deutsche Chemische Gesellschaft 61 (1928), 116–18.